A. L. GARFORD.
FENDER.
APPLICATION FILED MAR. 20, 1911.
1,110,433. Patented Sept. 15, 1914.
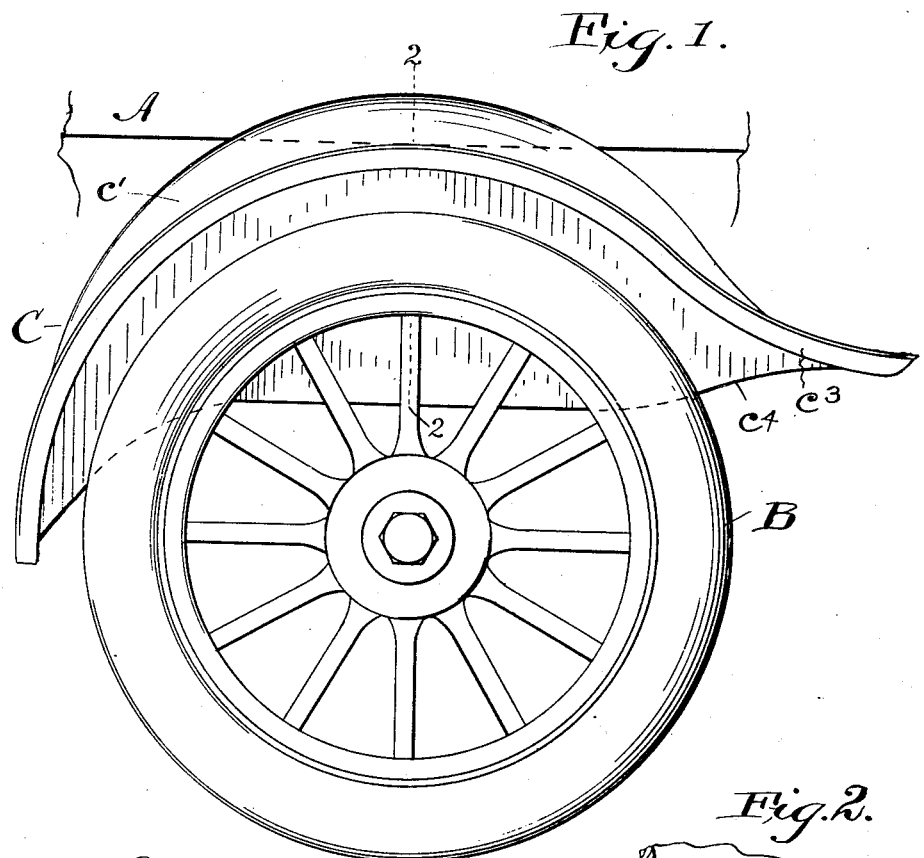
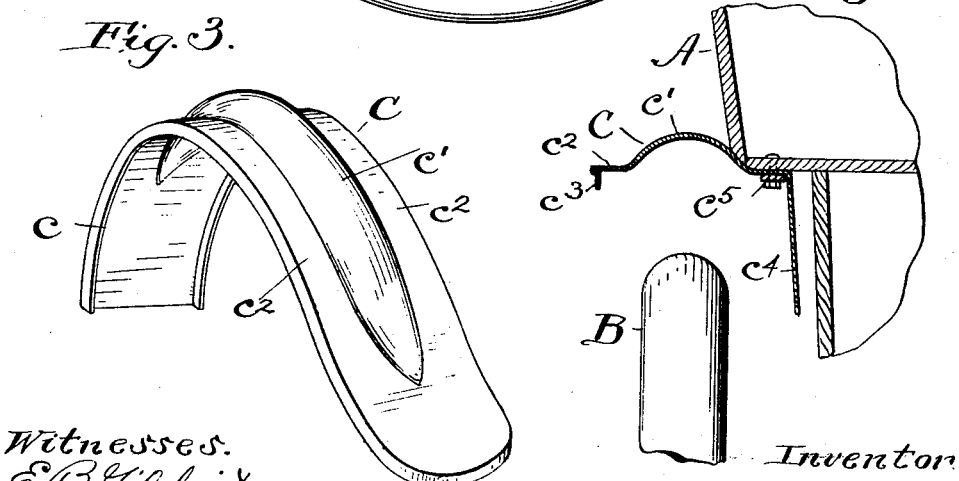
Witnesses.
E. B. Gilchrist,
H. R. Sullivan.
Inventor.
Arthur L. Garford
by Thurston & Kwis
Attys.

UNITED STATES PATENT OFFICE.

ARTHUR L. GARFORD, OF ELYRIA, OHIO, ASSIGNOR TO THE GARFORD COMPANY, OF ELYRIA, OHIO, A CORPORATION OF OHIO.

FENDER.

1,110,433.   Specification of Letters Patent.   Patented Sept. 15, 1914.

Application filed March 20, 1911. Serial No. 615,479.

*To all whom it may concern:*

Be it known that I, ARTHUR L. GARFORD, a citizen of the United States, residing at Elyria, in the county of Lorain and State of Ohio, have invented a certain new and useful Improvement in Fenders, of which the following is a full, clear, and exact description.

This invention relates to fenders for vehicle wheels and especially to fenders for the rear wheels of motor vehicles.

Fenders for the rear wheels of motor vehicles are usually so shaped or arranged as to provide a considerably greater clearance space between the fender and the wheel at the top or upper portion of the wheel than elsewhere, this being due, of course, to the relative vertical movement between the wheel and car body or fender. This large open clearance space between the fender and the top portion of the wheel is not only unattractive and far more unsightly than would be the case if the fender were low and conformed substantially to the contour of the wheel, but it has a further disadvantage with cars having wide bodies, such for example, as five or seven-passenger touring cars, that the side portions of the body are cut away or are so designed as to accommodate or receive the upper or top portions of the fenders, and this, because the top portions of the fenders are located so far above the wheels, has the effect of decreasing the cushion or seating space in the body.

One of the objects of the present invention is to provide a fender which while providing the necessary clearance above the tire, has the appearance of being low and of following the outline of the tire.

A further object is to provide a fender having the above characteristics, and which is inherently strong and rigid; which adapts itself by reason of its shape and rigidity for attachment to the car body in a very simple and easy manner, and which requires a considerably smaller wheel house or space in the side of the car body, and consequently interferes to a less extent with the cushion space in the body, than the fenders in use at the present time.

These and other objects are accomplished by my invention which may be briefly summarized as consisting in certain novel details of construction which will be described in the specification and set forth in the appended claim.

In the drawings, Figure 1 is a side elevation of my improved fender in proper position relative to the rear wheel and body, a small portion only of the latter being shown; Fig. 2 is a partial vertical section substantially along the line 2—2 of Fig. 1; and Fig. 3 is a perspective view of the fender, as it is formed from sheet metal and before attachment to the vehicle.

Referring now to the drawings, A represents a portion of the car body, B the rear wheel, and C the fender constructed in accordance with my invention. The fender C includes a body portion $c$ which is preferably formed as usual from sheet metal and is arched or rounded so as to extend partially about the wheel B. The particular design and shape of the body portion may be varied somewhat from that shown without departing from the spirit of my invention. Instead of extending the body portion $c$ as a whole a considerable distance above the top portion of the wheel so as to provide the necessary clearance space, this body portion is made to substantially follow the outline of the wheel at the front and top, and is provided in the upper part thereof with an outwardly bowed corrugation $c'$ which extends lengthwise of the fender directly above the wheel, so as to accommodate the upper portion thereof and provide the necessary clearance. This bowed corrugation does not in the present case extend to the ends of the fender, but from the top or middle thereof, gradually tapers or decreases in height until it disappears leaving the end portions of the fender flat so that the forward end may be readily attached to the running board of the car, and the rear end may have a tail-lamp clamped thereto, if desired. Furthermore, the corrugation $c'$ is located a distance from the side edges of the fender, leaving on opposite sides of the corrugation, wing or flange-like projections $c^2$ which in the present case are flat in cross section, inasmuch as in any preferred construction, the body portion, except for the corrugation, is flat in cross section. The fender is usually provided along its outer edge with a downwardly extending flange $c^3$ and may have attached to its inner edge an apron $c^4$ which extends downwardly between the wheel and car body. It will be noted that with this construction, the fender has the appearance of being low, and of following the outline of the tire, thus causing the car as a whole to have a better appearance than it would have if the body portion of the fender projected above the tire to the height of the highest part of the corrugation. Furthermore, the corrugations $c'$ make the fender quite rigid, and in fact so strengthens the fender that it can be attached and held securely to the body by means of a single strap or bracket $c^5$, which, as shown in Fig. 2, extends beneath and clamps the inner flange portion $c^2$ to the under side of the offset or undercut portion of the car body. Furthermore, inasmuch as only the inner side portion of the fender need extend into the wheel-house or undercut portion of the body, leaving the bowed corrugations projecting above this part of the body, a much smaller wheel house is required by this construction, and there is obviously less interference with the cushion space in the body than is the case with the usual construction of fenders which require or render desirable the cutting away of the body to accommodate the fender at its highest point.

Having thus described my invention, what I claim is:

In combination, in a vehicle, a vehicle body, a rear wheel and fender, the body having a recess portion in its side opposite the rear wheel, and the fender having a body substantially flat in cross section and provided at a distance from both ends and from both edges with an upwardly bowed corrugation adapted to accommodate the top of the wheel, the inner side edge of the fender extending into said recess of the body and substantially all the said corrugation being exterior to said recess.

In testimony whereof, I hereunto affix my signature in the presence of two witnesses.

ARTHUR L. GARFORD.

Witnesses:
LUCIUS N. BUTLER,
ARTHUR L. PATRICK.